(12) United States Patent
Fujino et al.

(10) Patent No.: US 7,391,603 B2
(45) Date of Patent: Jun. 24, 2008

(54) ELECTRIC DOUBLE LAYER CAPACITOR AND ELECTROLYTIC SOLUTION THEREFOR

(75) Inventors: Takeshi Fujino, Wako (JP); Byoungju Lee, Wako (JP); Masayuki Takeda, Yokkaichi (JP); Hideo Nagaoka, Yokkaichi (JP); Hiroo Miyauchi, Yokkaichi (JP); Daisuke Noda, Yokkaichi (JP)

(73) Assignees: Honda Motor Co., Ltd., Tokyo (JP); Mitsubishi Chemical Corporation, Tokyo (JP)

( * ) Notice: Subject to any disclaimer, the term of this patent is extended or adjusted under 35 U.S.C. 154(b) by 98 days.

(21) Appl. No.: 11/435,292

(22) Filed: May 17, 2006

(65) Prior Publication Data
US 2006/0262485 A1     Nov. 23, 2006

(30) Foreign Application Priority Data
May 18, 2005   (JP) .............................. 2005-145792
May 12, 2006   (JP) .............................. 2006-133874

(51) Int. Cl.
*H01G 9/00* (2006.01)
*H01G 9/02* (2006.01)

(52) U.S. Cl. ...................................... 361/502; 252/62.2

(58) Field of Classification Search ......... 361/502–503; 252/62.2
See application file for complete search history.

(56) References Cited

U.S. PATENT DOCUMENTS

| 7,173,807 | B2 * | 2/2007 | Kawasato et al. ............ 361/502 |
| 2002/0031710 | A1 * | 3/2002 | Kezuka et al. .............. 429/303 |

FOREIGN PATENT DOCUMENTS

| JP | 09-275042 A | 10/1997 |
| JP | 2001-217150 A | 8/2001 |
| JP | 2001-223137 A | 8/2001 |
| JP | 2004-006803 A | 1/2004 |
| JP | 2004-146610 A | 5/2004 |
| WO | WO 2005008700 A1 * | 1/2005 |

* cited by examiner

*Primary Examiner*—Eric Thomas
(74) *Attorney, Agent, or Firm*—Arent Fox LLP

(57) ABSTRACT

In an electric double layer capacitor and electrolytic solution, decomposition of at least one of an open-chain carbonate and a cyclic carbonate can be controlled under high temperature conditions, initial performance and maintained ratio of capacitance are superior, and energy density is high, when graphitized alkali-activated carbon is used as an electrode material and at least one of an open-chain carbonate and a cyclic carbonate is used in an organic electrolytic solution. The electric double layer capacitor includes electrodes containing alkali-activated carbon including graphitized carbon material, and an organic electrolytic solution in which a supporting salt is dissolved in solvent including aromatic carboxylate and at least one of an open-chain carbonate and a cyclic carbonate, in which the content of the aromatic carboxylate is not more than 50 weight % relative to the total weight of the solvent.

6 Claims, No Drawings

ELECTRIC DOUBLE LAYER CAPACITOR AND ELECTROLYTIC SOLUTION THEREFOR

BACKGROUND OF THE INVENTION

1. Field of the Invention

The present invention relates to techniques to improve durability of electric double layer capacitors.

2. Background Art

Electric double layer capacitors may be used in a wide range of temperatures and have high power density. In order to improve the energy density of such capacitors, it is necessary to increase working voltage. As an electrolytic solution, a nonaqueous electrolytic solution (organic electrolytic solution) which mainly consists of at least one of an open-chain carbonate and a cyclic carbonate as a solvent and a quaternary ammonium salt as a supporting salt, can be widely used. In the case in which the voltage is increased in an electrolytic solution containing at least one of an open-chain carbonate and a cyclic carbonate as a main solvent, the electrolytic solution gradually decomposes, internal pressure in a capacitor housing is increased by generated gas, and many problems occur.

Furthermore, in a capacitor using alkali-activated carbon, when the electrolytic solution in which solvent consists of at least one of an open-chain carbonate and a cyclic carbonate is used at high working voltage under high temperature conditions, the amount of gas generated by solvent decomposition is increased, and this is therefore not preferable. That is, it is difficult for such an electrolytic solution to be used at high working voltage under high temperature conditions because decomposition of the solvent is promoted and gas, such as carbon dioxide gas, is generated.

In addition, considering improvement in conductivity, change ratio of capacitance, etc., various solvents or mixed solvents have been proposed as an electrolytic solution for capacitors. In regard to suitability in practical use of electrolytic solutions for capacitors, there are various requirements for physical characteristics, such as low-temperature characteristics, solubility of salt (dielectric constant), safety, decomposability of the electrolytic solution, boiling point, cost, etc., and as an electrolytic solution for capacitors which satisfies these requirements, open-chain carbonates and cyclic carbonates are widely used.

As an electrode material, since an alkali-activation method can produce activated carbon having high capacity, a method in which activated carbon is produced by alkali-activating easily graphitizable carbon material, is known (Japanese Unexamined Patent Application Publication No. Hei 09-275042). However, in a capacitor using alkali-activated carbon, the amount of gas generated by solvent decomposition is greater than one in a capacitor using steam-activated carbon, and many problems occur when cell structures form. In particular, in the case in which a carbonate type solvent is used at high working voltage under high temperature conditions, the solvent is decomposed and $CO_2$ is generated.

As a technique which reduces the amount of decomposed gas such as carbon dioxide gas, etc., a method which uses solvent containing γ-butyrolactone or γ-valerolactone (Japanese Unexamined Patent Application Publication No. 2001-217150), a method which uses an organic electrolytic solution containing fluorobenzene (Japanese Unexamined Patent Application Publication No. 2004-6803), and a method which uses a nonaqueous electrolytic solution containing diphenyl (Japanese Unexamined Patent Application Publication No. 2004-146610), have been suggested.

However, in the case in which alkali-activated carbon consisting of graphite material is used, the amount of the generated gas cannot be controlled sufficiently by the above techniques.

SUMMARY OF THE INVENTION

An object of the present invention is to provide an electric double layer capacitor in which, in the case in which graphitized alkali-activated carbon having high capacity is used as an electrode material and at least one of an open-chain carbonate and a cyclic carbonate is used in an organic electrolytic solution, decomposition of the at least one of an open-chain carbonate and a cyclic carbonate can be controlled under high temperature conditions, initial performance and maintained ratio of capacitance are superior, and energy density is high.

The electric double layer capacitor of the present invention includes electrodes containing alkali-activated carbon containing graphitized carbon material, and an organic electrolytic solution in which a supporting salt is dissolved in a solvent including an aromatic carboxylate and at least one of an open-chain carbonate and a cyclic carbonate, in which the content of the aromatic carboxylate is not more than 50 weight % relative to the total weight of the solvent. In addition, in the present invention, it is preferable that the aromatic carboxylate be at least one of alkyl benzoate and dialkyl phthalate. Furthermore, in the present invention, it is preferable that the content of the aromatic carboxylate be 12 to 40 weight % relative to the total weight of the solvent. Additionally, in the present invention, it is preferable that the supporting salt contain pyrrolidinium salt.

According to the present invention, an electric double layer capacitor, in which an amount of gas generated by solvent decomposition can be reduced, initial performance and maintained ratio of capacitance are superior, and energy density is high, can be produced, even if easily-graphitizable alkali-activated carbon having high capacity is used as an electrode material, and at least one of an open-chain carbonate and a cyclic carbonate is used as an organic electrolytic solution. In addition, according to an aspect in which the aromatic carboxylate is at least one of alkyl benzoate and dialkyl phthalate, capacitance can be further improved. Furthermore, according to an aspect in which the content of the aromatic carboxylate is 12 to 40 weight % in the organic electrolytic solution, the effect of controlling generated gas can be maintained, and in addition, problems in which the electrolyte is deposited and performance at low temperatures is deteriorated, can be suppressed. Additionally, according to an aspect in which the supporting salt contains pyrrolidinium salt, chemical stability of the electrolytic solution can be improved in comparison with other supporting salts.

A mechanism of the effect which controls generated gas in the electric double layer capacitor of the present invention is believed to be as follows. In alkali-activated carbon using easily-graphitizable carbon material, many hydrogen ions are easily formed by hydrolysis of $BF_4^-$, in comparison with steam-activated carbon, and therefore, at least one of an open-chain carbonate and a cyclic carbonate is easily decomposed. On the surface of the alkali-activated carbon, water remaining on the surface of the carbon reacts with $BF_4^-$ attracted thereto during charging, and a strong acid such as HF is formed. The inside of the activated carbon is thereby acidified, and oxidative decomposition of the at least one of an open-chain carbonate and a cyclic carbonate is substantial. In addition, the reason why addition of the aromatic carboxylate is effective is believed to be as follows. By adsorbing aromatic carboxylate primarily at the surface of the carbon so as to limit the reaction field of $H_2O+BF_4^-$, or by reacting with aromatic carboxylate primarily rather than least one of an open-chain carbonate and a cyclic carbonate under conditions in which HF is generated by reaction of $H_2O+BF_4^-$, decomposition of the at least one of an open-chain carbonate and a cyclic carbonate is controlled and an amount of generated gas can be reduced. Furthermore, the reason for the remarkable effect of alkali-activated carbon, in particular, alkali-activated carbon consisting of easily graphitizable carbon material, is believed to be as follows. Since the surface of the carbon is composed primarily of an edge surface, strongly adsorbed water is not eliminated and the amount of adsorbed water is greater than that in other activated carbons, even if it is sufficiently dried. Therefore, in the present invention, of the activated carbons containing easily graphitizable carbon material, an activated carbon having many micropores and having low specific surface area (1,000 $m^2$/g or less), in particular, an activated carbon having a specific surface area of 100 to 800 $m^2$/g, exhibits significant effects in reducing decomposition of electrolytic solutions. As the open-chain carbonate and the cyclic carbonate, ethylene carbonate, propylene carbonate, butylene carbonate, dimethyl carbonate, ethylmethyl carbonate, diethyl carbonate, can be used.

BEST MODE FOR CARRYING OUT THE INVENTION

The electric double layer capacitor of the present invention includes electrodes containing alkali-activated carbon containing graphitized carbon material, and an organic electrolytic solution in which a supporting salt was dissolved in solvent including an aromatic carboxylate and at least one of an open-chain carbonate and a cyclic carbonate. In the following, these components will be explained in detail.

1. Activated Carbon Electrode

The electrodes in the electric double layer capacitor of the present invention consists of alkali-activated carbon of graphitized carbon material. As a carbon material, a mesophase pitch, in particular a distilled pitch such as a petroleum oil based pitch or a coal based pitch, coke containing the pitch, needle coke, chemically synthesized pitch, PVC pitch, or the like is desirable. As an alkali activating method, for example, methods disclosed in Japanese Unexamined Patent Application Publications Nos. 2002-15958, 2002-134369, Hei 09-275042, and Hei 10-121336, can be used.

Specifically, carbon material may be carbonized in a nitrogen stream at 700° C. for 1 hour and be crushed, and a graphitized carbon material may thereby be prepared. The graphitized carbon material is heated in a nitrogen stream in a primary process at 400° C. for 3 hours and in a secondary process at 750° C. for 3 hours, using potassium hydroxide, so as to carry out alkali activation, and then is sufficiently cleaned, and an alkali-activated carbon for use in the present invention may thereby be prepared. Next, the alkali-activated carbon prepared as above, a conductive filler, and a binder are mixed and kneaded at a specific mixing ratio, and then an activated carbon electrode sheet can be produced by rolling the mixture.

2. Organic Electrolytic Solution

The organic electrolytic solution in the present invention is an electrolytic solution for use with an electric double layer capacitor using alkali-activated carbon containing graphitized material as an electrode, aromatic carboxylate and at least one of an open-chain carbonate and a cyclic carbonate are contained, and the content of the aromatic carboxylate is not more than 50 weight % relative to the total weight of the solvent. In the present invention, it is preferable that the aromatic carboxylate be at least one of alkyl benzoate and dialkyl phthalate, and in addition, it is preferable that the aromatic carboxylate be contained at 12 to 40 weight % relative to the total weight of the solvent in the organic electrolytic solution.

(1) Supporting Salt

As the supporting salt in the present invention, any supporting salts can be used, so long as the effects of the present invention are not impaired. Specifically, as a cation component of the supporting salt in the present invention, quaternary ammonium, quaternary phosphonium, quaternary imidazolium, alkali metal ion, etc., can be used, and in particular, cation components containing pyrrolidinium salt are preferable.

(a) As the quaternary ammonium, the following ammonium can be preferably used.

(i) Tetraalkyl Ammonium

For example, tetramethyl ammonium, ethyltrimethyl ammonium, diethyldimethyl ammonium, triethylmethyl ammonium, tetraethyl ammonium, trimethyl-n-propyl ammonium, trimethylisopropyl ammonium, trimethyl-n-butyl ammonium, trimethylisobutyl ammonium, trimethyl-t-butyl ammonium, trimethyl-n-hexyl ammonium, dimethyldi-n-propyl ammonium, dimethyldiisopropyl ammonium, dimethyl-n-propylisopropyl ammonium, methyltri-n-propyl ammonium, methyltriisopropyl ammonium, methyldi-n-propylisopropyl ammonium, methyl-n-propyldiisopropyl ammonium, triethyl-n-propyl ammonium, triethylisopropyl ammonium, triethyl-n-butyl ammonium, triethylisobutyl ammonium, triethyl-t-butyl ammonium, dimethyldi-n-butyl ammonium, dimethyldiisobutyl ammonium, dimethyldi-t-butyl ammonium, dimethyl-n-butylethyl ammonium, dimethylisobutylethyl ammonium, dimethyl-t-butylethyl ammonium, dimethyl-n-butylisobutyl ammonium, dimethyl-n-butyl-t-butyl ammonium, dimethylisobutyl-t-butyl ammonium, diethyldi-n-propyl ammonium, diethyldiisopropyl ammonium, diethyl-n-propylisopropyl ammonium, ethyltri-n-propyl ammonium, ethyltriisopropyl ammonium, ethyldi-n-propylisopropyl ammonium, ethyl-n-propyldiisopropyl ammonium, diethylmethyl-n-propyl ammonium, ethyldimethyl-n-propyl ammonium, ethylmethyldi-n-propyl ammonium, diethylmethylisopropyl ammonium, ethyldimethylisopropyl ammonium, ethylmethyldiisopropyl ammonium, ethylmethyl-n-propylisopropyl ammonium, tetra-n-propyl ammonium, tetraisopropyl ammonium, n-propyltriisopropyl ammonium, di-n-propyldiisopropyl ammonium, tri-n-propylisopropyl ammonium, trimethylbutyl ammonium, trimethylpentyl ammonium, trimethylhexyl ammonium, trimethylheptyl ammonium, trimethyloctyl ammonium, tetra-n-butyl ammonium, trimethylnonyl ammonium, trimethyldecyl ammonium, trimethylundecyl ammonium, trimethyldodecyl ammonium, diethylmethoxyethylmethyl ammonium, etc., can be used. Of these, a quaternary ammonium having two or more kinds of different alkyl groups is preferable, and in particular, triethylmethyl ammonium, diethyldimethyl ammonium, and ethyltrimethyl ammonium are preferable.

(ii) Aromatic Substituted Ammonium

For example, trimethylphenyl ammonium, tetraphenyl ammonium, etc., can be used.

(iii) Aliphatic Cyclic Ammonium

For example, pyrrolidiniums such as N,N-dimethylpyrrolidinium, N-ethyl-N-methylpyrrolidinium, N,N-dimethylpyrrolidinium, N,N-tetramethylene pyrrolidinium, etc.; piperidiniums such as N,N-dimethyl piperidinium, N-ethyl-N-methyl piperidinium, N,N-diethyl piperidinium, N,N-tetramethylene piperidinium, N,N-pentamethylene piperidinium, etc.; morpholiniums such as N,N-dimethyl morpholinium, N-ethyl-N-methyl morpholinium, N,N-diethyl morpholinium, etc., can be used. Of these, pyrrolidiniums is preferable, and N-ethyl-N-methylpyrrolidinium and N,N-tetramethylene pyrrolidinium are more preferable.

(iv) Heterocyclic Aromatic Compound Containing Ionized Nitrogen

For example, pyridiniums such as N-methylpyridinium, N-ethyl pyridinium, N-n-propyl pyridinium, N-isopropyl pyridinium, N-n-butylpyridinium, etc., can be used.

Of these quaternary ammoniums, (i) tetraalkyl ammonium and (iii) aliphatic cyclic ammonium are preferable, and (iii) aliphatic cyclic ammonium is more preferable.

(b) As the quaternary phosphonium, tetramethyl phosphonium, triethylmethyl phosphonium, tetraethyl phosphonium, tetra-n-butyl phosphonium, etc., can be used.

(c) As the quaternary imidazolium, 1,3-dimethyl imidazolium, 1,2,3-trimethyl imidazolium, 1-ethyl-3-methyl imidazolium, 1-ethyl-2,3-dimethyl imidazolium, 1,3-diethyl imidazolium, 1,2-diethyl-3-methyl imidazolium, 1,3-diethyl-2-methyl imidazolium, 1,2-dimethyl-3-n-propyl imidazolium, 1-n-butyl-3-methyl imidazolium, 1,2,4-trimethyl-3-n-propyl imidazolium, 1,2,3,4-tetramethyl imidazolium, 1,2,3,4,5-pentamethyl imidazolium, 2-ethyl-1,3-dimethyl imidazolium, 1,3-dimethyl-2-n-propyl imidazolium, 1,3-dimethyl-2-n-pentyl imidazolium, 1,3-dimethyl-2-n-heptyl imidazolium, 1,3,4-trimethyl imidazolium, 2-ethyl-1,3,4-trimethyl imidazolium, 1,3-dimethylbenzo imidazolium, 1-phenyl-3-methyl imidazolium, 1-benzyl-3-methyl imidazolium, 1-phenyl-2,3-dimethyl imidazolium, 1-benzyl-2,3-dimethyl imidazolium, 2-phenyl-1,3-dimethyl imidazolium, 2-benzyl-1,3-dimethyl imidazolium, 1,3-dimethyl-2-n-undecyl imidazolium, 1,3-dimethyl-2-n-heptadecyl imidazolium, etc., can be used. Of these, 1,3-dimethyl imidazolium and 1-ethyl-3-methyl imidazolium are preferable.

In addition, in the organic electrolytic solution in the present invention, a quaternary imidazolium containing ether group can also be used, and as a suitable example, 2-ethoxymethyl-1,3-dimethyl imidazolium, 1-ethoxymethyl-2,3-dimethyl imidazolium, etc., can be used.

(d) As an alkali metal ion, lithium, sodium, potassium, cesium, and rubidium, can be used.

As an anion component of the supporting salt in the present invention, for example, inorganic ions containing fluorine atoms such as tetrafluoro borate, hexafluoro phosphate, hexafluoro arsenate, hexafluoro antimonate, hexafluoro niobate, hexafluoro tantalate, tetrafluoro aluminate, etc.; trifluoromethane sulfonate, perchlorate, bis(trifluoro methane sulfonyl)imide, bis(pentafluoro ethane sulfonyl)imide, tris(trifluoro methane sulfonyl)methide, parfluoro alkylborate, parfluoro alkylphosphate, etc., can be used. Of these, tetrafluoro borate is preferable.

The supporting salt in the present invention is used after purity is increased to a desire level by refining, such as by recrystallization, solvent extraction, etc., since high purity is desired. It is preferable that the content of the supporting salt in the organic electrolytic solution in the present invention be in a range which ensures sufficient ion concentration to form an electric double layer and yields sufficient electric conductivity. The lower limit of the salt concentration is preferably 0.4 mol/L, and is more preferably 0.8 mol/L. The upper limit of the salt concentration is preferably 6 mol/L, is more preferably 2.5 mol/L, and is most preferably 2 mol/L.

(2) Open-Chain Carbonate and Cyclic Carbonate

The organic electrolytic solution in the present invention contains at least one of an open-chain carbonate and a cyclic carbonate as a solvent. Specifically, as an open-chain carbonate, dimethyl carbonate, ethylmethyl carbonate, diethyl carbonate, etc., can be used, and as a cyclic carbonate, ethylene carbonate, propylene carbonate, 2,3-dimethylethylene carbonate, butylene carbonate, etc., can be used.

(3) Aromatic Carboxylate

The organic electrolytic solution in the present invention contains further aromatic carboxylate as a solvent. Specifically, alkyl benzoates such as methyl benzoate, ethyl benzoate, etc.; dialkyl phthalates such as dimethyl phthalate, ethylmethyl phthalate, diethyl phthalate, etc.; methyl o-toluate, methyl m-toluate, methyl p-toluate, methyl 1-naphthoate, methyl 2-naphthoate, dimethyl isophthalate, dimethyl terephthalate, etc., can be used. Of these, methyl benzoate, ethyl benzoate, and dimethyl phthalate are preferable.

The content of aromatic carboxylate in the present invention is preferably not more than 50 weight % relative to the total weight of solvent, and is more preferably not more than 40 weight %. When the content of aromatic carboxylate exceeds 50 weight %, electrolyte salt is deposited and low-temperature properties are deteriorated, and therefore this is not preferable in practical use. In contrast, the lower limit of the content of aromatic carboxylate is not limited to specific values; however, it is preferably 5 weight % or more, is more preferably 12 weight % or more, and is most preferably 15 weight % or more. When the content of aromatic carboxylate is not more than 5 weight %, the effect of controlling generated gas is not sufficient, and this is not preferable. In addition, the electrolytic solution is preferably in a condition in which each component is mixed and dispersed without separating, in practical use; however, the effect of controlling the generated gas is obtained even if the components are not always mixed and dispersed.

(4) Additives

The organic electrolytic solution in the present invention may contain additives. Considering the effect of the electric double layer capacitor of the present invention, the additives are selected from any compounds which have withstand voltage, do not generate gas or the like in decomposing, and do not have undesirable effects on capacitor characteristics. Additionally, in the electric double layer capacitor of the present invention, two or more kinds of the additives may be used in combination. Furthermore, in the present invention, a synergistic effect is further obtained by mixing additives such as fluorobenzene, cyclohexane, etc., which adsorb on the surface of carbon. According to these additives, continual reductive decomposition reaction of at least one of an open-chain carbonate and a cyclic carbonate is prevented by producing compounds which are stable in the present invention, and reaction of at least one of an open-chain carbonate and a cyclic carbonate which is a main solvent is prevented by adsorbing primarily on the surface of the carbon, and the amount of generated gas can thereby be reduced.

The content of the additives in the electrolytic solution is decided by properties and characteristics of the additives; however, it is preferable that the additives be contained at 12 to 30 weight % in an electrolytic solution in practical use. When the content is 12 weight % or more, remarkable effects are observed. In contrast, when the content exceeds 30 weight %, there is the fear that the internal pressure of the capacitor cell will be increased by increasing the vapor pressure of the electrolytic solution after mixing, and in the case in which the electrolytic solution consists primarily of carbonate, the electrolytic solution cannot be uniformly produced by separating. Furthermore, when the content of the additives is increased at a low temperature, the solubility of salt in the electrolytic solution is reduced, deposition or precipitation of the salt occurs, and therefore, ionic conductivity is decreased. Here, the electrolytic solution is preferably in a condition in which each component is mixed and dispersed without separating, in practical use; however, the effect which controls the generated gas is obtained, even if the components are not always mixed and dispersed.

In addition, these additives can be effectively utilized using a method impregnating the electrolytic solution after the element is produced by adsorbing organic compounds in a gas state, even if they do not dissolve in the electrolytic solution.

3. Electric Double Layer Capacitor

The electric double layer capacitor of the present invention may be a cylindrical electric double layer capacitor including an aluminum case having a diameter of 40 mm and a length of 120 mm, a rolled-type electrode, and electrolytic solution injected therein. The rolled-type electrode is an element produced by adhering activated carbon electrode sheets to both sides of a band-shaped collector consisting of aluminum foil, using a conductive adhesive, so as to produce each sheet-shaped electrode for an anode or a cathode, and laminating and rolling up the sheet-shaped electrodes with a sandwiched separator. The element is inserted in the aluminum case, so that there is no gap at the periphery, and a terminal area thereof is welded, so that the aluminum case is enclosed. Subsequently, the electrolytic solution is injected to the inside from an injection hole, and a cylindrical electric double layer capacitor is produced. In a rolled-type device structure, the size of the device can be freely changed by controlling the width and length of the electrodes. Furthermore, by rolling strongly, the electrodes in the device can be compressed and the fill ratio of activated carbon can be improved.

The structure of the capacitor cell is not particularly limited, and in the case in which a cubic or cuboidal case is used, electrodes are stacked and inserted into the case. In this case, the volume efficiency of the capacitor module in which plural cells are connected can be improved compared to the cylindrical case. As a material of the case in which the device is inserted, any kind of material can be used; however, volume change during charging and discharging of not more than 1% is desirable, and practically, Al, Ti, Mg, Fe, Cr, Ni, Mn, Co, Zr, or an alloy containing at least one of these metals can be used.

EXAMPLES

In the following, effects of the present invention will be explained in detail with reference to Examples.

1. Production of Electric Double Layer Capacitor

Example 1

Carbon material was carbonized in a nitrogen stream at 700° C. for 1 hour and was crushed, and graphitized carbon material was prepared. The graphitized carbon material was heated in a nitrogen stream in a primary process at 400° C. for 3 hours and in a secondary process at 750° C. for 3 hours, using potassium hydroxide, so as to carry out alkali activation, and then was cleaned sufficiently, and alkali-activated carbon having a specific surface area of 790 m$^2$/g, micropore volume measured by a t-plot method of 0.34 ml/g, an amount of functional groups on the overall surface measured by a titration method of 0.7 meq/g, an amount of K in the activated carbon of 200 ppm, and average particle diameter of 10 μm, was produced.

Next, the alkali-activated carbon, acetylene black (conductive filler) and polytetrafluoroethylene (binding agent) were mixed so as to be 90:5:5 by weight ratio and were kneaded, and an activated carbon electrode sheet having molding density of electrode of 0.8 g/cm$^3$ and thickness of 140 μm was produced by rolling the kneaded mixture.

In the meantime, an organic electrolytic solution was prepared by dissolving triethylmethylammonium tetrafluoroborate [$(C_2H_5)_3(CH_3)NBF_4$] in propylene carbonate solvent containing methyl benzoate at 3 weight %, so as to have a final concentration of 1.7 mol/L. It was confirmed that the moisture amount of the prepared electrolytic solution was 30 ppm or less.

Next, the above activated carbon electrode sheets were adhered to both sides of a band-shaped collector consisting of aluminum foil, using conductive adhesive, and each sheet-shaped electrode for an anode or a cathode was thereby produced. Then, these sheet-shaped electrodes were laminated sandwiching a separator, and were rolled up, so as to produce an element. The element was inserted in an aluminum case having a diameter of 40 mm and a length of 120 mm, so that there was no gap at the periphery, and a terminal area thereof was welded, so that the aluminum case was enclosed. Subsequently, the above electrolytic solution was injected to the inside from an injection hole, and a cylindrical electric double layer capacitor of Example 1 was produced.

Example 2

An electric double layer capacitor of Example 2 was produced in the same manner as that of Example 1, except that the content of methyl benzoate in the solvent was set to be 6 weight %, in a production process for an electric double layer capacitor of Example 1.

Example 3

An electric double layer capacitor of Example 3 was produced in the same manner as that of Example 1, except that the content of methyl benzoate in the solvent was set to be 12 weight %, in a production process for an electric double layer capacitor of Example 1.

Example 4

An electric double layer capacitor of Example 4 was produced in the same manner as that of Example 1, except that the content of methyl benzoate in the solvent was set to be 20 weight %, in a production process for an electric double layer capacitor of Example 1.

Example 5

An electric double layer capacitor of Example 5 was produced in the same manner as that of Example 1, except that content of methyl benzoate in the solvent was set to be 40 weight %, in a production process for an electric double layer capacitor of Example 1.

Example 6

An electric double layer capacitor of Example 6 was produced in the same manner as that of Example 1, except that methyl benzoate having a content in the solvent of 3 weight % was replaced with dimethyl phthalate having a content in the solvent of 3 weight %, in a production process for an electric double layer capacitor of Example 1.

Example 7

An electric double layer capacitor of Example 7 was produced in the same manner as that of Example 1, except that the content of dimethyl phthalate in the solvent was set to be 6 weight %, in a production process for an electric double layer capacitor of Example 6.

Example 8

An electric double layer capacitor of Example 8 was produced in the same manner as that of Example 1, except that the content of dimethyl phthalate in the solvent was set to be 12 weight %, in a production process for an electric double layer capacitor of Example 6.

Example 9

An electric double layer capacitor of Example 9 was produced in the same manner as that of Example 1, except that the content of dimethyl phthalate in the solvent was set to be 20 weight %, in a production process for an electric double layer capacitor of Example 6.

Example 10

An electric double layer capacitor of Example 10 was produced in the same manner as that of Example 1, except that the content of dimethyl phthalate in the solvent was set to be 40 weight %, in a production process for an electric double layer capacitor of Example 6.

Example 11

A mixed solvent of methyl benzoate, propylene carbonate, ethylene carbonate, and methyl propionate (methyl benzoate:propylene carbonate:ethylene carbonate:methyl propionate=25:45:5:25 by weight ratio) was prepared. Then, an organic electrolytic solution was prepared by dissolving N-ethyl-N-methylpyrrolidinium tetrafluoroborate in the mixed solvent so as to have a final concentration of 1.8 mol/L. An electric double layer capacitor of Example 11 was produced in the same manner as that of Example 1, except that the above organic electrolytic solution was used, in a production process for an electric double layer capacitor of Example 1.

Example 12

An organic electrolytic solution was prepared by dissolving N,N-tetramethylenepyrrolidinium tetrafluoroborate in the mixed solvent in Example 11, so as to have a final concentration of 1.8 mol/L. An electric double layer capacitor of Example 12 was produced in the same manner as that of Example 1, except that the above organic electrolytic solution was used, in a production process for an electric double layer capacitor of Example 1.

Comparative Example 1

An electric double layer capacitor of Comparative Example 1 was produced in the same manner as that of Example 1, except that a propylene carbonate solution containing 1.7 mol/L triethylmethylammonium tetrafluoroborate $[(C_2H_5)_3(CH_3)NBF_4]$, without methyl benzoate, was used as the organic electrolytic solution, in a production process for an electric double layer capacitor of Example 1.

Comparative Example 2

An electric double layer capacitor of Comparative Example 2 was produced in the same manner as that of Comparative Example 1, except that steam-activated carbon (trade name: BP-20, produced by Kuraray Co., Ltd.) was used instead of the alkali-activated carbon in a production process for an electric double layer capacitor of Comparative Example 1.

Comparative Example 3

An electric double layer capacitor of Comparative Example 3 was produced in the same manner as that of Example 3, except that steam-activated carbon (trade name: BP-20, produced by Kuraray Co., Ltd.) was used instead of the alkali-activated carbon in a production process for an electric double layer capacitor of Example 3.

2. Evaluations (1) Performance Change

With respect to the electric double layer capacitors of Examples 1 to 12 and Comparative Examples 1 to 3 produced as described above, aging was carried out by applying a voltage of 2.7 V at 65° C. for 6 hours, and 30 A constant-current discharge was carried out, and initial capacitance was measured at 25° C. Subsequently, a durability acceleration test was carried out by applying 2.7 V constant-voltage at 65° C. in a constant temperature oven for 1,000 hours. After the durability test, a cell of the capacitor was cooled to 25° C., and capacitance was measured, and then the maintained ratio of capacitance during the durability test was calculated by an energy conversion method. The results are shown in Table 1.

TABLE 1

|  | Aromatic Carboxylate (weight %) |  | Initial Performance Capacitance (F) | Performance after 1,000 Hours | |
|---|---|---|---|---|---|
|  |  |  |  | Capacitance (F) | Maintained Ratio of Capacitance (%) |
| Example 1 | Methyl Benzoate | 3 | 1930 | 1755 | 91 |
| Example 2 | Methyl Benzoate | 6 | 1955 | 1876 | 96 |
| Example 3 | Methyl Benzoate | 12 | 1964 | 1886 | 96 |

TABLE 1-continued

|  | Aromatic Carboxylate (weight %) | Initial Performance Capacitance (F) | Performance after 1,000 Hours | |
|---|---|---|---|---|
|  |  |  | Capacitance (F) | Maintained Ratio of Capacitance (%) |
| Example 4 | Methyl Benzoate 20 | 1997 | 1917 | 96 |
| Example 5 | Methyl Benzoate 40 | 2035 | 1954 | 96 |
| Example 6 | Dimethyl Phthalate 3 | 1940 | 1745 | 90 |
| Example 7 | Dimethyl Phthalate 6 | 1955 | 1824 | 95 |
| Example 8 | Dimethyl Phthalate 12 | 1964 | 1843 | 96 |
| Example 9 | Dimethyl Phthalate 20 | 1997 | 1843 | 96 |
| Example 10 | Dimethyl Phthalate 40 | 2035 | 1843 | 96 |
| Example 11 | Methyl Benzoate 25 | 2020 | 1920 | 95 |
| Example 12 | Methyl Benzoate 25 | 2025 | 1945 | 96 |
| Comparative Example 1 | Aromatic Carboxylate 0 | 1920 | 1709 | 89 |
| Comparative Example 2 | Aromatic Carboxylate 0 | 1248 | 1111 | 89 |
| Comparative Example 3 | Methyl Benzoate 20 | 1250 | 1150 | 92 |

(2) Decomposed Amount of Electrolytic Solution

Internal pressure in the cell during the durability test was increased by generated gas due to decomposition of the electrolytic solution. Therefore, the gas inside the cell after the above durability test was removed by using a syringe, so that the internal pressure was reduced to atmospheric pressure, and the amount of generated gas was determined by measuring the volume removed. In addition, decreasing ratio of generated gas in each Example was calculated by comparing with Comparative Example 1 which did not contain aromatic carboxylate as a standard. The results are shown in Table 2.

TABLE 2

|  | Aromatic Carboxylate (weight %) | Amount of Generated Gas (cm$^3$) | Decrease Ratio (%) |
|---|---|---|---|
| Example 1 | Methyl Benzoate 3 | 44 | 92 |
| Example 2 | Methyl Benzoate 6 | 40 | 83 |
| Example 3 | Methyl Benzoate 12 | 24 | 50 |
| Example 4 | Methyl Benzoate 20 | 20 | 42 |
| Example 5 | Methyl Benzoate 40 | 16 | 33 |
| Example 6 | Dimethyl Phthalate 3 | 44 | 92 |
| Example 7 | Dimethyl Phthalate 6 | 40 | 83 |
| Example 8 | Dimethyl Phthalate 12 | 22 | 46 |
| Example 9 | Dimethyl Phthalate 20 | 18 | 38 |
| Example 10 | Dimethyl Phthalate 40 | 14 | 29 |
| Example 11 | Methyl Benzoate 25 | 14 | 29 |
| Example 12 | Methyl Benzoate 25 | 12 | 25 |
| Comparative Example 1 | Aromatic Carboxylate 0 | 48 |  |
| Comparative Example 2 | Aromatic Carboxylate 0 | 30 |  |
| Comparative Example 3 | Methyl Benzoate 20 | 22 |  |

As is apparent from Table 1, in the electric double layer capacitors of Examples 1 to 12 according to the present invention, the maintained ratio of capacitance after the durability test for 1,000 hours was high. In contrast, in the electric double layer capacitors of Comparative Examples 1 and 2 which did not contain an aromatic carboxylate in the organic electrolytic solution, and in the electric double layer capacitors of Comparative Examples 2 and 3 in which steam-activated carbon was used as activated carbon, the maintained ratio of capacitance after the durability test for 1,000 hours was decreased.

In addition, as is apparent from Table 2, in the electric double layer capacitors of Examples 1 to 12 according to the present invention, superior effects in which generated gas was decreased by adding aromatic carboxylate were observed. In contrast, in the electric double layer capacitors of Comparative Examples 2 and 3, as is apparent from comparison with Comparative Example 1 and Example 3, the decreasing ratio of generated gas was slight, even if aromatic carboxylate was contained at 20 weight %.

What is claimed is:

1. An electric double layer capacitor comprising:
   electrodes containing alkali-activated carbon comprising graphitized carbon material; and an organic electrolytic solution in which supporting salt is dissolved in a solvent including an aromatic carboxylate and at least one of an open-chain carbonate and a cyclic carbonate, the content of the aromatic carboxylate is 12 to 40 weight % relative to the total weight of the solvent.

2. The electric double layer capacitor according to claim 1, wherein the aromatic carboxylate is at least one of alkyl benzoate and dialkyl phthalate.

3. The electric double layer capacitor according to claim 1, wherein the supporting salt includes pyrrolidinium salt.

4. An electrolytic solution for an electric double layer capacitor using alkali-activated carbon containing graphitized carbon material as an electrode, the electrolytic solution comprising:
   a solvent containing aromatic carboxylate and at least one of an open-chain carbonate and a cyclic carbonate, wherein content of the aromatic carboxylate is 12 to 40 weight % relative to the total weight of the solvent.

5. The electrolytic solution for an electric double layer capacitor according to claim 4, wherein the aromatic carboxylate is at least one of alkyl benzoate and dialkyl phthalate.

6. The electrolytic solution for an electric double layer capacitor according to claim 4, wherein the supporting salt includes pyrrolidinium salt.

* * * * *